United States Patent
Qiu et al.

(10) Patent No.: US 10,601,586 B2
(45) Date of Patent: Mar. 24, 2020

(54) METHOD AND APPARATUS FOR KEY MANAGEMENT OF END ENCRYPTED TRANSMISSION

(71) Applicant: SICHUAN JIUZHOU ELECTRIC GROUP CO., LTD, Sichuan (CN)

(72) Inventors: Jigang Qiu, Sichuan (CN); Xinyong Wu, Sichuan (CN); Jia Yang, Sichuan (CN)

(73) Assignee: SICHUAN JIUZHOU ELECTRIC GROUP CO., LTD, Sichuan (CN)

( * ) Notice: Subject to any disclaimer, the term of this patent is extended or adjusted under 35 U.S.C. 154(b) by 222 days.

(21) Appl. No.: 15/739,693

(22) PCT Filed: Dec. 23, 2015

(86) PCT No.: PCT/CN2015/098482
§ 371 (c)(1),
(2) Date: Dec. 22, 2017

(87) PCT Pub. No.: WO2017/092092
PCT Pub. Date: Jun. 8, 2017

(65) Prior Publication Data
US 2018/0199191 A1 Jul. 12, 2018

(30) Foreign Application Priority Data
Dec. 4, 2015 (CN) .......................... 2015 1 0885208

(51) Int. Cl.
*H04L 29/06* (2006.01)
*H04L 9/08* (2006.01)
(Continued)

(52) U.S. Cl.
CPC .............. *H04L 9/08* (2013.01); *H04L 9/0819* (2013.01); *H04L 9/0861* (2013.01); *H04L 9/14* (2013.01); *H04W 12/02* (2013.01)

(58) Field of Classification Search
None
See application file for complete search history.

(56) References Cited

U.S. PATENT DOCUMENTS

| 2010/0268953 | A1 | 10/2010 | Matsukawa et al. |
| 2011/0246780 | A1* | 10/2011 | Yeap .................. G06Q 20/02 713/176 |

(Continued)

FOREIGN PATENT DOCUMENTS

| CN | 101866668 A | 10/2010 |
| CN | 104038930 A | 9/2014 |
| CN | 104184591 A | 12/2014 |

*Primary Examiner* — Andrew J Steinle
(74) *Attorney, Agent, or Firm* — Arc IP Law, PC; Joseph J. Mayo (57) ABSTRACT

Provided is a method and an apparatus for determining a key pair, and a data processing method. The method for determining a key pair includes the steps of: generating a key pair index value based on a preset initial value of a key pair index, a scrambling code value, and an ID of a device performing data communication or a multicast/broadcast ID; determining key pair data as required from a secure storage area according to the key pair index value; and decrypting the key pair data using a preset high level key pair to obtain a required key pair. This method renders it possible for a data receiver and a data transmitter to "agree on" an encryption key, without a key management entity such as KTC/KDC. Thus, encrypted transmission of voice and data information can be achieved, thereby solving the problem of information leakage in an existing wireless communication procedure.

20 Claims, 3 Drawing Sheets

(51) Int. Cl.
*H04L 9/14* (2006.01)
*H04W 12/02* (2009.01)

(56) References Cited

U.S. PATENT DOCUMENTS

2012/0102322 A1* 4/2012 O'Brien .............. H04L 9/3271
                                                                     713/168
2014/0114120 A1   4/2014 Oser et al.
2017/0078088 A1* 3/2017 Shanmugam ......... H04L 9/0662

\* cited by examiner

METHOD AND APPARATUS FOR KEY MANAGEMENT OF END ENCRYPTED TRANSMISSION

This application is a National Stage Entry under 35 U.S.C. § 371 of PCT International Application Number PCT/CN2015/098482, filed on 23 Dec. 2015, which claims priority to Chinese Patent Application Number CN 201510885208.0, filed on 4 Dec. 2015, wherein the specifications and contents of which are all hereby incorporated herein by reference in their entirety.

BACKGROUND OF THE INVENTION

Field of the Invention

The present disclosure relates to the field of communication technology, and more particularly, to a method and an apparatus for key management of end encrypted transmission.

Description of the Related Art

With the rapid development of the mobile communication industry, cell phones are not only widely used in personal life, but also play an increasingly important role in various fields such as government affairs and business activities. However, there are some security risks in an existing mobile communication network, resulting in frequent occurrences of wireless eavesdropping and other events. For example, GSM system, as a mainstream mobile communication system, only supports airport encryption, but cannot provide secure end-to-end encrypted communication. Depending on this feature of the GSM system, criminals can use pseudo-base stations and other devices for voice eavesdropping and data theft.

In response to this, relative domestic and foreign manufacturers have conducted in-depth technical researches into the end-to-end encrypted transmission system. Corresponding technical solutions mainly include three kinds. First, a transceiver performs additional analog-digital conversion, digital-analog conversion, and encryption/decryption processing on original voices or data through an external hardware device. Second, an encryption/decryption device is built in a cell phone, to perform encryption/decryption processing on voices and other information after processing of analog-digital conversion and source coding. Third, specialized VoIP communication software is designed, to perform encryption/decryption processing on users' SMS and call information.

It can be seen from the above, the existing end-to-end encryption mechanism is generally based on an operator's communication link, which also adds an additional layer of encryption protection measure. However, due to costs, security and other factors, the existing end-to-end encryption mechanism cannot be achieved with the aid of the communication operator's existing KDC/KTC and other infrastructure. Such being the case, it has become a technical problem to be solved urgently as to how to negotiate, between two communicating parties, an encrypted key pair to achieve end-to-end encrypted data transmission.

BRIEF SUMMARY OF THE INVENTION

In order to solve the above problem, the present disclosure provides a method for determining a key pair, comprising:

a key pair index value generation step: generating a key pair index value based on a preset initial value of a key pair index, a scrambling code value, and an ID of a device performing data communication or a multicast/broadcast ID;

a key pair data determination step: determining key pair data as required from a secure storage area according to the key pair index value; and a key pair determination step: decrypting the key pair data using a preset high level key to obtain a key pair as required.

According to one embodiment of the present disclosure, when a point-to-point transmission mode is used between a data receiver and a data transmitter, in the key pair index value generation step, the key pair index value is generated by the preset algorithm based on the preset initial value of the key pair index, the scrambling code value, the ID of the device performing data communication, and key pair number used for supporting point-to-point transmission.

According to one embodiment of the present disclosure, in the key pair index value generation step, the key pair index value is generated according to the following expression:

$$I_{key}=F_{Harsh}(ID_A,ID_B,P_t,I_{key\_int})\mod(N-k),$$

wherein $I_{key}$ represents the key pair index; $ID_A$ and $ID_B$ represent IDs of a data receiving device and a data transmitting device, respectively; $P_t$ represents a scrambling code value related to current time t; $I_{key\_int}$ represents the preset initial value of the key pair index; N represents a total key pair number stored in the secure storage area; and k represents key pair number stored in the secure storage area for supporting multicast/broadcast.

According to one embodiment of the present disclosure, when a multicast/broadcast transmission mode is used between the data receiver and the data transmitter, in the key pair index value generation step, the key pair index value is generated by preset algorithm based on the preset initial value of the key pair index, the scrambling code value, the multicast/broadcast ID, and key pair number used for supporting multicast/broadcast transmission.

According to one embodiment of the present disclosure, in the key pair index value generation step, the key pair index value is generated according to the following expression:

$$I_{key}=F_{Harsh}(ID_C,0,P_t,I_{key\_int})\mod(k)+(N-k),$$

wherein $I_{key}$ represents the key pair index value; $ID_C$ represents the multicast/broadcast ID; $P_t$ represents the scrambling code value related to current time t; $I_{key\_int}$ represents the preset initial value of the key pair index; N represents the total key pair number stored in the secure storage area; and k represents the key pair number stored in the secure storage area for supporting multicast/broadcast.

According to one embodiment of the present disclosure, with the current time t as an input, the scrambling code value $P_t$ is generated by a level-m PN sequence code generator.

According to one embodiment of the present disclosure, the preset initial value of the key pair index is obtained by means of an encryption channel protocol constructed with a preset high-level encryption key during first communication of a device for data communication.

The present disclosure further provides an apparatus for determining a key pair, comprising:

a key pair data storage module, used for storing key pair data, the key pair data being a key pair encrypted by a preset high level key;

a key pair index value generation module, used for determining a key pair index value based on a preset initial value of a key pair index, a scrambling code value, and an ID of a device performing data communication;

a key pair data determination module, connected to the key pair data storage module and the key pair index value generation module, and used for selecting key pair data corresponding to the key pair index value from the key pair data storage module; and a key pair data decryption module, connected to the key pair data determination module, and used for decrypting the key pair data with the preset high level key, so as to obtain the key pair as required.

According to one embodiment of the present disclosure, the key pair index value generation module is configured to generate the key pair index value by preset algorithm, based on the preset initial value of the key pair index, the scrambling code value, the ID of the device performing data communication, and key pair number used for supporting point-to-point transmission.

According to one embodiment of the present disclosure, the key pair index value generation module is configured to generate the key pair index value according to the following expression:

$$I_{key}=F_{Harsh}(ID_A, ID_B, P_t, I_{key\_int}) \bmod(N-k),$$

wherein $I_{key}$ represents the key pair index value; $ID_A$ and $ID_B$ represent IDs of a data receiving device and a data transmitting device, respectively; $P_t$ represents a scrambling code value related to current time t; $I_{key\_int}$ represents the preset initial value of the key pair index; N represents a total key pair number stored in a secure storage area; and k represents key pair number stored in the secure storage area for supporting multicast/broadcast.

According to one embodiment of the present disclosure, the key pair index value generation module is configured to generate the key pair index value by preset algorithm based on the preset initial value of the key pair index, the scrambling code, IDs of both a data receiving device and a data transmitting device, and key pair number for supporting the multicast/broadcast transmission.

According to one embodiment of the present disclosure, the key pair index value generation module is configured to generate the key pair index value according to the following expression:

$$I_{key}=F_{Harsh}(ID_C, 0, P_t, I_{key\_int}) \bmod(k)+(N-k)$$

wherein $I_{key}$ represents the key pair index value; $ID_C$ represents a multicast/broadcast ID; $P_t$ represents the scrambling code value related to current time t; $I_{key\_int}$ represents the preset initial value of the key pair index; N represents the total key pair number stored in the secure storage area; and k represents the key pair number stored in the secure storage area for supporting multicast/broadcast.

The present disclosure further provides a data processing method, comprising the steps of:

determining a key pair using aye one of the above methods; and encrypting data to be transmitted or decrypting data received according to the key pair.

The present disclosure provides a non-switched key pair determination method and apparatus, and a data processing method for encrypting or decrypting data using a key pair determined by the key pair determination method. This key pair determination method renders it possible for the data receiver and the data transmitter to "agree on" an encryption key, without a key management entity such as KTC/KDC. Thus, encrypted transmission of voice and data information can be achieved, thereby solving the problem of information leakage in an existing wireless communication procedure.

The method for determining a key pair provided by the present disclosure does not require creation of a new key management entity such as enterprise-level KTC/KDC. Therefore, in addition to saving deployment expenses, this method can also avoid security risks, which would be otherwise caused when KTC/KDC are attacked. At the same time, in the method, the data transmitter and the data receiver, by determining a key pair index according to a predetermined rule, actually solidify the key in a security area of a cell phone, thus ensuring high confidentiality and integrity of a communication procedure. In addition, the method can ensure encrypted transmission of multicast/broadcast services by introducing a special index value corresponding to the key pair of multicast/broadcast.

Other features and advantages of the present disclosure will be further explained in the following description, and partly become self-evident therefrom, or be understood through implementation of the present disclosure. The objectives and advantages of the present disclosure will be achieved through the structure specifically pointed out in the description, claims, and the accompanying drawings.

BRIEF DESCRIPTION OF THE DRAWINGS

In order to explain the technical solution of the embodiments of the present disclosure or the technical solution in the prior art in a clearer manner, the accompanying drawings used in illustrating the prior art or the embodiments of the present disclosure are briefly introduced as follows, in which.

DETAILED DESCRIPTION OF THE INVENTION

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no conflict, all the technical features mentioned in all the embodiments may be combined together in any manner, and the technical solutions obtained in this manner all fall within the scope of the present disclosure.

Meanwhile, various specific details are expounded in the following to provide a thorough understanding of the embodiments of the present disclosure. However, it is obvious for a person skilled in the art that, the present disclosure can be implemented through other specific details or in other specific manners than those described herein.

In addition, the steps as illustrated in the flow chart of the accompanying drawings can be executed in a computer system under, for example, a set of computer-executable instructions. Furthermore, despite the logical order indicated in the flow chart, the steps as shown or described can, in some circumstances, be executed in an order different from the logical order shown in the flow chart.

At present, a key management system for end-to-end encrypted transmission, especially encrypted voice transmission, is gradually attracting the attention of all people in the industry. A proposed technical solution to key management has been adopted in specific situations.

One straightforward solution is to set up centralized KDC/KTC for end-to-end encrypted transmission. The KDC/KTC select keys for both a transmitter and a receiver, and transmit the keys to the transmitter and the receiver through specific secret channels. A main drawback of such a solution lies in that it is necessary to set up additional enterprise-level KDC/KTC, which is a large investment. In addition, the safety and stability of the KDC/KTC and the secure channels thereof are of paramount importance. It will result in disruption of all communication links or system-wide data leaks once the KDC/KTC or the secure channels thereof become invalid or are attacked.

Another solution is to perform key negotiation in a point-to-point mode by a data transmitting end and a data receiving end through a specific signaling channel, and to transmit a public key for voice or data encryption to an opposite end through a specific channel. To use such a technical solution, on the one hand, it will be necessary to consider a more stringent or higher level of encryption measure, so as to ensure security of a key transmission channel; on the other hand, each time data communication occurs, it requires negotiation of a key, which leads to additional signaling overhead and delay in connection establishment.

In view of the above-mentioned problems in the prior art, the present disclosure provides a data processing method based on a non-switched key cooperation mechanism. As a result, both the transmitter and the receiver can "agree on" an encryption key, without a key management entity such as KTC/KDC, thereby achieving encrypted transmission of voice and data information and solving the problem of information leakage in an existing wireless communication procedure.

Figure 1:
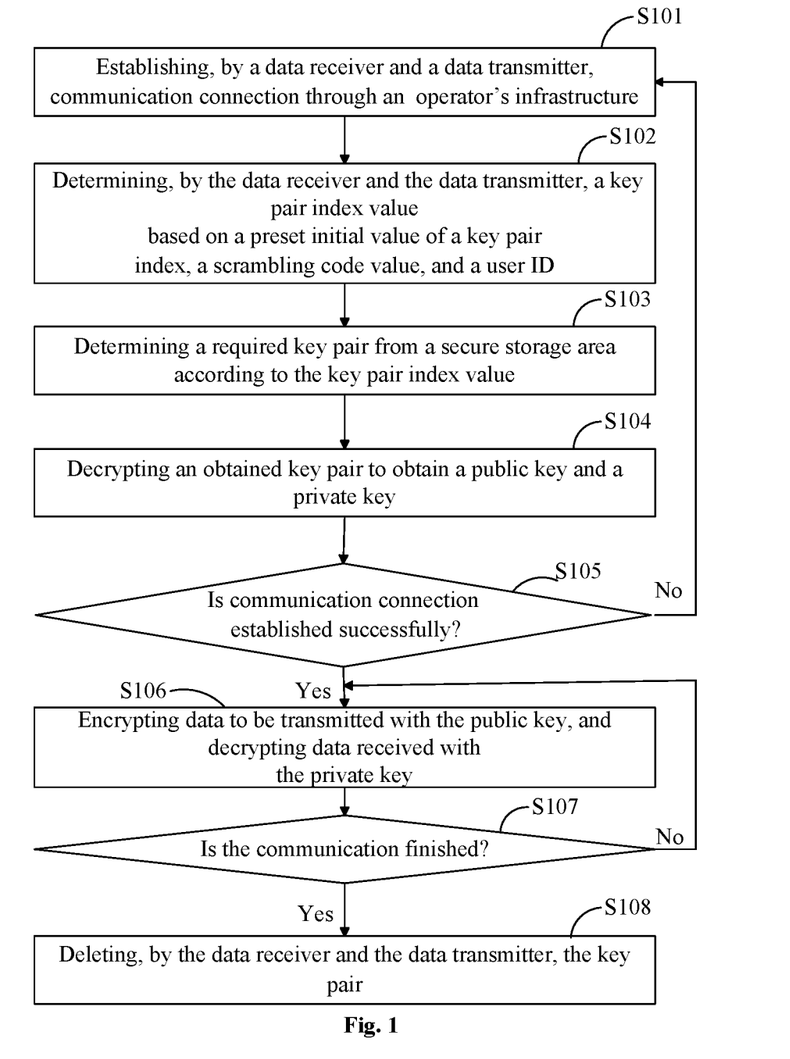
FIG. 1 is a flow chart of a data processing method according to one embodiment of the present disclosure.

FIG. 1 shows a flow chart of a data processing method according to the present embodiment.

As shown in FIG. 1, according to the data processing method provided in the present embodiment, communication connection is established between a data transmitter and a data receiver through an operator's infrastructure in step S101.

Figure 2:
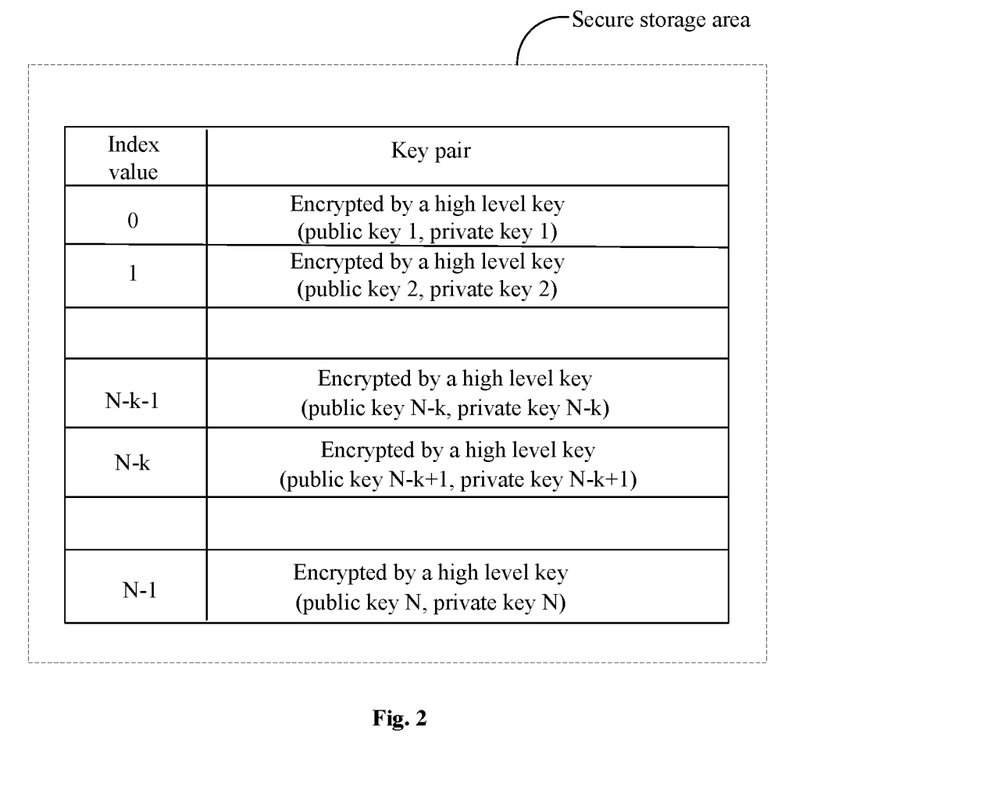
FIG. 2 schematically shows the structure of a secure storage area according to one embodiment of the present disclosure.

In a key pair index value generation step S102 of the method, the key pair index value is determined based on the preset initial value of the key pair index, a scrambling code value, and an ID of a device performing data communication. In the present embodiment, a key pair for data encryption and decryption is solidified in a codebook form into a secure storage area such as a ROM and a cell phone Trust zone. As shown in FIG. 2, in the present embodiment, the key pair data stored in the secure storage area include both key pair data for point-to-point communication, and also key pair data for multicast/broadcast, wherein there are N–k groups of key pair data for point-to-point communication, and k groups of key pair data for multi cast/broadcast.

It should be noted that, in other embodiments of the present disclosure, when the data transmission mode of the data transmitting/receiving apparatuses is point-to-point transmission, only key pairs for the point-to-point communication may be stored in the secure storage area; while when the data transmission mode of the data transmitting/receiving apparatuses is multicast or broadcast, only key pairs for multicast/broadcast can be stored in the secure storage area. The present disclosure is not limited thereto.

Meanwhile, it should also be noted that, in various embodiments of the present disclosure, the codebook may be estimated and configured in terms of size according to a user scale of an entire encryption system (i.e., device number included in the entire encryption system). Key pairs stored in the secure storage area entities such as a ROM and cell phone Trust zone request higher-level keys for encryption treatment, and can only be read or decrypted by a specific device or application, so as to prevent leakage thereof. At the same time, in the case of a device (such as a cell phone) containing a secure storage area is lost, it is possible to send a command to the device containing the secure storage area through a remote management center for data locking or deletion, so as to ensure the security of the key and related data.

Specifically, in the present embodiment, the key pair index value is determined in step S102 by a non-traceable built-in module, wherein the key pair index value is mapped using default algorithm (such as hash algorithm) based on user IDs of both a data transmitter and a data receiver, an initial value of a key pair index $I_{key\_int}$, scrambling code value $P_t$, and other data. Specifically, in the present embodiment, the key pair index value $I_{key}$ may be determined according to the following expression:

$$I_{key}=F_{Harsh}(ID_A,ID_B,P_t,I_{key\_int})\bmod(N-k), \qquad (1)$$

wherein $ID_A$ and $ID_B$ represent IDs of the data receiver and the data transmitter, respectively; $P_t$ represents a scrambling code value related to current time t; $I_{key\_int}$ represents the preset initial value of the key pair index; $N=2^n$ represents a total key pair number stored in a secure storage area; and k represents key pair number stored in the secure storage area for supporting multicast/broadcast.

In the present embodiment, the preset initial value $I_{key\_int}$ of the key pair index is preferably zero. It is to be noted that, in other embodiments of the present disclosure, the preset initial value $I_{key\_int}$ of the key pair index can also be negotiated by both the data receiver and the data transmitter, through a point-to-point data signature procedure, before establishment of the communication connection out of security enhancement consideration. The present invention is not limited thereto.

The scrambling code value $P_t$ is a PN sequence code associated with current time t, which is generated with a level m PN sequence code generator with the current time t as an input. It can be seen from the expression (1), difference in the establishment time of the communication connection will cause the scrambling code value $P_t$ to randomly jump with time. This, together with non-traceability of a hash value calculation procedure, enables the method provided by the present embodiment to be effective in ensuring anti-attack capability of the key pair.

As shown in FIG. 1 again, when the key pair index value is obtained in step S102, the required key pair data are determined from the secure storage area based on the obtained key pair index value in step S103 of the present method. Specifically, when the key pair index value obtained in step S102 is i (0≤i≤N–k), key pair data, i.e., $i^{th}$ key pair data encrypted by a high-level key, corresponding to the key pair index value will be extracted from the secure storage area, that is, in step S103.

In a key pair determination step S104, key pair data obtained in step S104 are decrypted by the high-level key, to obtain a desired key pair (including a public key and a private key).

At this point, both the data receiver and the data transmitter complete the key pair determination step.

When the desired key pair is obtained, it is determined in step S105 of the method whether the communication connection is established successfully. If the communication connection is established successfully, step S106 is executed to encrypt data to be transmitted with the public key, or to decrypt received data with the private key; while if the communication connection is not established successfully, step S101 will be returned to reestablish the communication connection.

According to the method, it will be determined whether current communication is completed or not in step S107. If the communication is not completed, step S106 will be continued. Otherwise, step S108 will be executed to delete the obtained key pair, so as to prevent other illegal applications from stealing the key pair, thereby ensuring the security of the key pair, and further ensuring security of data transmission.

It should be noted that, in other embodiments of the present disclosure, data transmission and reception may be performed in the form of multicast or broadcast encrypted communication. In this case, in step S102, the key pair index value $I_{key}$ will be determined based on the multicast ID or the broadcast ID, the scrambling code $P_r$, and the initial value of the key pair index $I_{key\_int}$.

Specifically, in this embodiment, the key pair index value $I_{key}$ is determined according to the following expression:

$$I_{key}=F_{Harsh}(ID_C,0,P_r,I_{key\_int})\bmod(k)+(N-k), \qquad (2)$$

wherein, $ID_C$ represents the multicast ID or broadcast ID.

Figure 3:
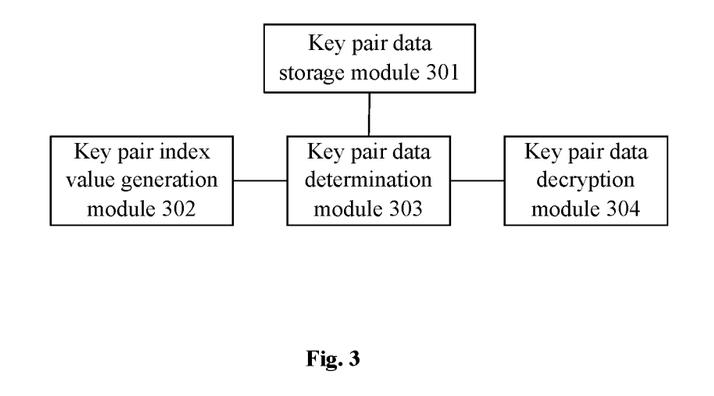
FIG. 3 schematically shows the structure of an apparatus for determining a key pair according to one embodiment of the present disclosure.

In the present embodiment, an apparatus is further provided for determining a key pair, and FIG. 3 shows a structural diagram of the apparatus.

As shown in FIG. 3, the apparatus for determining a key pair provided in the present embodiment includes a key pair data storage module 301, a key pair index value generation module 302, a key pair data determination module 303, and a key pair data decryption module 304, wherein the key pair data storage module 301 is used to store key pair data, which are a key pair encrypted by a preset high level key.

The key pair data storage module 301 is a secure storage area that uses a higher level key (i.e., the preset high level key) to encrypt stored data. In the present embodiment, the key pair data storage module is implemented with a ROM. It should be noted that indifferent embodiments of the present disclosure, the key pair data storage module 301 may also be achieved with other reasonable components or circuits, and the present disclosure is not limited thereto. For example, in one embodiment of the present disclosure, the key pair data storage module 301 may also be achieved with trust zone.

As shown in FIG. 2, in the present embodiment, the key pair data storage module 301 stores both key pair data for users' point-to-point communication, and also stores key pair data for multicast and broadcast communication.

The key pair index value generation module 302 is used to determine the key pair index value based on the preset initial value of the key pair index, the scrambling code value, and the ID of the device that performs data communication, wherein when the data receiver and the data transmitter use point-to-point communication, the key pair index value generation module 302 will use preset algorithm (such as hash algorithm) to determine the key pair index value, based on the user IDs of both the data receiver and the data transmitter, the preset initial value of the key pair index, the scrambling code value, and the like.

Specifically, in the present embodiment, the key pair index value generation module 302 determines the key pair index value $I_{key}$ according to expression (1) when the data receiver and the data transmitter use point-to-point communication. In the present embodiment, the preset initial value $I_{key\_int}$ of the key pair index is preferably zero. It is to be noted that, in other embodiments of the present disclosure, the preset initial value of the key pair index $I_{key\_int}$ can also be negotiated by the data receiver and the data transmitter, through a point-to-point data signature procedure, before establishment of the communication connection out of security enhancement consideration. The present disclosure is not limited thereto.

The key pair index value generation module 302 will determine the key pair index value $I_{key}$ based on the multicast ID or the broadcast ID, the scrambling code value $P_r$, and the initial value of the key pair index $I_{key\_int}$ when the data receiver and the data transmitter perform data communication by multicast or broadcast. Specifically, in the present embodiment, the key pair index value generation module 302 will determine the key pair index value $I_{key}$ according to expression (2).

The key pair data determination module 303 is connected to the key pair data storage module 301 and the key pair index value generation module 302, for selecting key pair data corresponding to the key pair index value from the key pair data storage module 301. Specifically, when the key pair index value generated by the key pair index value generation module 302 is i (0≤i≤N−k), the key pair data determination module 303 will extract the key pair data, i.e., $i^{th}$ key pair data, corresponding to the key pair index value from the key pair data storage module 301. The $i^{th}$ key pair data refer to an $i^{th}$ key pair encrypted by the high level key.

The key pair data decryption module 304 is connected to the key pair data determination module 303, for decrypting key pair data transmitted from the key pair data determination module 303 using the preset high level key, to obtain a desired key pair.

From the above description, it can be seen that, in the present embodiment, it provides a non-switched key pair determination method and a data processing method for encrypting or decrypting data using a key pair determined by the non-switched key pair determination method. This key pair determination method renders it possible for the data receiver and the data transmitter to "agree on" an encryption key, without a key management entity such as KTC/KDC. Thus, encrypted transmission of voice and data information can be achieved, thereby solving the problem of information leakage in an existing wireless communication procedure.

The method for determining a key pair provided by the present embodiment does not require creation of a new key management entity such as enterprise-level KTC/KDC. Therefore, while saving deployment expenses, this method can also avoid security risks, which would be otherwise caused when KTC/KDC are attacked. At the same time, in the method, the data receiver and the data transmitter, by determining a key pair index according to a predetermined rule, actually solidify the key in a secure area of a cell phone, thus ensuring high confidentiality and integrity of a communication procedure. In addition, the method can ensure encrypted transmission of multicast/broadcast services by introducing a special index value corresponding to the key pair of multicast and broadcast.

It should be understood that, the embodiments disclosed herein are not limited by the specific processing steps disclosed herein, but incorporate the equivalent substitutes of these features which are comprehensible to those skilled in the art. It could be also understood that, the terms used herein are for describing the specific embodiments, not for limiting them.

The embodiments are described hereinabove to interpret the principles of the present disclosure in one application or a plurality of applications. However, those skilled in the art, without departing from the principles and thoughts of the present disclosure, can make various modifications to the forms, usages, and details of the embodiments of the present disclosure without any creative work. Accordingly, the present disclosure is defined by the appended claims.

What is claimed is:

1. A method for determining a key pair, comprising:
a key pair index value generation step: generating a key pair index value based on a preset initial value of a key pair index, a scrambling code value, and an ID of a device performing data communication or a multicast/broadcast ID;
a key pair data determination step: determining key pair data as required from a secure storage area according to the key pair index value; and
a key pair determination step: decrypting the key pair data using a preset high level key to obtain a key pair as required.

2. The method according to claim 1, wherein when a point-to-point transmission mode is used between a data receiver and a data transmitter, in the key pair index value generation step, the key pair index value is generated by preset algorithm based on the preset initial value of the key pair index, the scrambling code value, the ID of the device performing data communication, and key pair number used for supporting point-to-point transmission.

3. The method according to claim 2, wherein in the key pair index value generation step, the key pair index value is generated according to the following expression:

$$I_{key}=F_{Harsh}(ID_A,ID_B,P_t,I_{key\_int})\bmod(N-k),$$

wherein $I_{key}$ represents the key pair index value; $ID_A$ and $ID_B$ represent IDs of a data receiving device and a data transmitting device, respectively; $P_t$ represents a scrambling code value related to current time t; $I_{key\_int}$ represents the preset initial value of the key pair index; N represents a total key pair number stored in the secure storage area; and k represents key pair number stored in the secure storage area for supporting multicast/broadcast.

4. The method according to claim 1, wherein when a multicast/broadcast transmission mode is used between the data receiver and the data transmitter, in the key pair index value generation step, the key pair index value is generated by preset algorithm based on the preset initial value of the key pair index, the scrambling code value, the multicast/broadcast ID, and key pair number used for supporting multicast/broadcast transmission.

5. The method according to claim 2, wherein when a multicast/broadcast transmission mode is used between the data receiver and the data transmitter, in the key pair index value generation step, the key pair index value is generated by preset algorithm based on the preset initial value of the key pair index, the scrambling code value, the multicast/broadcast ID, and key pair number used for supporting multicast/broadcast transmission.

6. The method according to claim 3, wherein when a multicast/broadcast transmission mode is used between the data receiver and the data transmitter, in the key pair index value generation step, the key pair index value is generated by preset algorithm based on the preset initial value of the key pair index, the scrambling code value, the multicast/broadcast ID, and key pair number used for supporting multicast/broadcast transmission.

7. The method according to claim 4, wherein the key pair index value generation step, the key pair index value is generated according to the following expression:

$$I_{key}=F_{Harsh}(ID_C,0,P_t,I_{key\_int})\bmod(k)+(N-k),$$

wherein $I_{key}$ represents the key pair index value; $ID_C$ represents the multicast/broadcast ID; $P_t$ represents a scrambling code value related to current time t; $I_{key\_int}$ represents the preset initial value of the key pair index; N represents the total key pair number stored in the secure storage area; and k represents the key pair number stored in the secure storage area for supporting multicast/broadcast.

8. The method according to claim 5, wherein the key pair index value generation step, the key pair index value is generated according to the following expression:

$$I_{key}=F_{Harsh}(ID_C,0,P_t,I_{key\_int})\bmod(k)+(N-k),$$

wherein $I_{key}$ represents the key pair index value; $ID_C$ represents the multicast/broadcast ID; $P_t$ represents a scrambling code value related to current time t; $I_{key\_int}$ represents the preset initial value of the key pair index; N represents the total key pair number stored in the secure storage area; and k represents the key pair number stored in the secure storage area for supporting multicast/broadcast.

9. The method according to claim 6, wherein the key pair index value generation step, the key pair index value is generated according to the following expression:

$$I_{key}=F_{Harsh}(ID_C,0,P_t,I_{key\_int})\bmod(k)+(N-k),$$

wherein $I_{key}$ represents the key pair index value; $ID_C$ represents the multicast/broadcast ID; $P_t$ represents a scrambling code value related to current time t; $I_{key\_int}$ represents the preset initial value of the key pair index; N represents the total key pair number stored in the secure storage area; and k represents the key pair number stored in the secure storage area for supporting multicast/broadcast.

10. The method according to claim 3, wherein with the current time t as an input, the scrambling code value $P_t$ is generated by a level-m PN sequence code generator.

11. The method according to claim 7, wherein with the current time t as an input, the scrambling code value $P_t$ is generated by a level-m PN sequence code generator.

12. The method according to claim 1, wherein the preset initial value of the key pair index is obtained by means of an encryption channel protocol constructed with a preset high-level encryption key during first communication of a device for data communication.

13. The method according to claim 2, wherein the preset initial value of the key pair index is obtained by means of an encryption channel protocol constructed with a preset high-level encryption key during first communication of a device for data communication.

14. The method according to claim 5, wherein the preset initial value of the key pair index is obtained by means of an encryption channel protocol constructed with a preset high-level encryption key during first communication of a device for data communication.

15. An apparatus for determining a key pair, comprising:
a key pair data storage area, used for storing key pair data, the key pair data being a key pair encrypted by a preset high level key;
a computer configured to
    determine a key pair index value based on a preset initial value of a key pair index, a scrambling code value, and an ID of a device performing data communication;
    select key pair data corresponding to the key pair index value from the key pair data storage area; and
    decrypt the key pair data with the preset high level key, so as to obtain the key pair as required.

16. The apparatus according to claim 15, wherein said computer is further configured to generate the key pair index value by preset algorithm, based on the preset initial value of the key pair index, the scrambling code value, the ID of the device performing data communication, and key pair number used for supporting point-to-point transmission.

17. The apparatus according to claim 16, wherein the computer is further configured to generate the key pair index value according to the following expression $$I_{key}=F_{Harsh}(ID_A,ID_B,P_t,I_{key\_int})\mod(N-k),$$

wherein $I_{key}$ represents the key pair index value; $ID_A$ and $ID_B$ represent IDs of a data receiving device and a data transmitting device, respectively; $P_t$ represents a scrambling code value related to current time t; $I_{key\_int}$ represents the preset initial value of the key pair index; N represents a total key pair number stored in a secure storage area; and k represents key pair number stored in the secure storage area for supporting multicast/broadcast.

18. The apparatus according to claim 15, wherein the computer is further configured to generate the key pair index value by preset algorithm based on the preset initial value of the key pair index, the scrambling code, IDs of a data receiving device and a data transmitting device, and key pair number to support the multicast/broadcast transmission.

19. The apparatus according to claim 18, wherein the computer is further configured to generate the key pair index value according to the following expression:

$$I_{key}=F_{Harsh}(ID_C,0,P_t,I_{key\_int})\mod(k)+(N-k),$$

wherein $I_{key}$ represents the key pair index value; $ID_C$ represents a multicast/broadcast ID; $P_t$ represents the scrambling code value related to current time t; $I_{key\_int}$ represents the preset initial value of the key pair index; N represents the total key pair number stored in the secure storage area; and k represents the key pair number stored in the secure storage area to support multicast/broadcast.

20. A data processing method, comprising the steps of:
a key pair index value generation step: generating a key pair index value based on a preset initial value of a key pair index, a scrambling code value, and an ID of a device performing data communication or a multicast/broadcast ID;
a key pair data determination step: determining key pair data as required from a secure storage area according to the key pair index value; and
a key pair determination step: decrypting the key pair data using a preset high level key to obtain a key pair as required; and
encrypting data to be transmitted or decrypting data received according to the key pair.

* * * * *